US009062989B2

(12) United States Patent
van Veldhoven

(10) Patent No.: US 9,062,989 B2
(45) Date of Patent: Jun. 23, 2015

(54) MAGNETIC FIELD SENSOR FOR SENSING ROTATION A REFERENCE COMPONENT ABOUT THE AXIS OF ROTATION THAT IS INDEPENDENT OF ALIGNMENT BETWEEN THE AXIS OF ROTATION AND THE SENSORS

(75) Inventor: Robert Hendrikus Margaretha van Veldhoven, Dommelen (NL)

(73) Assignee: NXP B.V., Eindhoven (NL)

( * ) Notice: Subject to any disclaimer, the term of this patent is extended or adjusted under 35 U.S.C. 154(b) by 723 days.

(21) Appl. No.: 12/968,963

(22) Filed: Dec. 15, 2010

(65) Prior Publication Data
US 2012/0153946 A1 Jun. 21, 2012

(51) Int. Cl.
G01B 7/30 (2006.01)
G01D 5/14 (2006.01)
G01D 5/245 (2006.01)

(52) U.S. Cl.
CPC .............. G01D 5/145 (2013.01); G01D 5/2451 (2013.01)

(58) Field of Classification Search
USPC ................. 324/165, 173, 174, 207.2, 207.21, 324/207.24, 207.25, 207.12, 225
See application file for complete search history.

(56) References Cited

U.S. PATENT DOCUMENTS

| 4,283,679 | A | * | 8/1981 | Ito et al. ........................ 324/165 |
| 4,677,377 | A | * | 6/1987 | Takahashi et al. ........ 324/207.12 |
| 4,737,710 | A | * | 4/1988 | Van Antwerp et al. .... 324/207.2 |
| 5,041,785 | A | * | 8/1991 | Bogaerts et al. ......... 324/207.24 |
| 5,359,287 | A | * | 10/1994 | Watanabe et al. ........ 324/207.21 |
| 5,532,583 | A | * | 7/1996 | Davis et al. ................... 324/202 |
| 5,637,995 | A | * | 6/1997 | Izawa et al. ................... 324/174 |
| 5,644,226 | A | * | 7/1997 | Aoyama et al. .......... 324/207.21 |
| 5,880,586 | A | * | 3/1999 | Dukart et al. .............. 324/207.2 |
| 6,104,186 | A | * | 8/2000 | Yamada et al. .......... 324/207.21 |
| 6,229,299 | B1 | * | 5/2001 | Strashny ....................... 324/174 |
| 7,323,864 | B2 | * | 1/2008 | Teulings et al. ............ 324/207.2 |
| 7,436,172 | B2 | * | 10/2008 | Matsumoto et al. .......... 324/174 |
| 8,125,221 | B2 | | 2/2012 | Muthers |
| 2002/0140420 | A1 | * | 10/2002 | Kinpara et al. .......... 324/207.21 |
| 2003/0178989 | A1 | * | 9/2003 | Vig et al. .................... 324/207.2 |
| 2005/0264282 | A1 | * | 12/2005 | Kawashima et al. .... 324/207.25 |
| 2006/0066296 | A1 | * | 3/2006 | Kuroyanagi et al. ...... 324/207.2 |
| 2008/0048651 | A1 | * | 2/2008 | Matsumoto et al. ....... 324/207.2 |

FOREIGN PATENT DOCUMENTS

| CN | 101384883 A | 3/2009 |
| CN | 101685145 A | 3/2010 |
| DE | 10 2008 026 604 A1 | 12/2009 |

* cited by examiner

Primary Examiner — Jay Patidar

(57) ABSTRACT

A sensor circuit is configured for operation under conditions susceptible to misalignment or movement. In connection with various example embodiments, an alignment-tolerant sensor arrangement includes a reference component and first and second magnetic sensors. The reference component influences a magnetic field as a function of a position of the reference component, such as via the positioning of a magnetic type of component. The first magnetic sensor is aligned with a first magnetic field sensitivity direction, and exhibits an electrical response to the presence of the magnetic field. The second magnetic sensor is aligned with a first magnetic field sensitivity direction and is configured to exhibit an electrical response to the presence of the magnetic field. The first and second magnetic field sensitivity directions being offset from one another to facilitate detection of magnetic fields at different relative alignments between the reference component and the first and second magnetic sensors.

20 Claims, 5 Drawing Sheets

MAGNETIC FIELD SENSOR FOR SENSING ROTATION A REFERENCE COMPONENT ABOUT THE AXIS OF ROTATION THAT IS INDEPENDENT OF ALIGNMENT BETWEEN THE AXIS OF ROTATION AND THE SENSORS

Various aspects of the present invention are directed to magnetic sensors, and more particularly to magnetic sensors that are amenable to implementation with applications susceptible to sensor movement such as twisting.

A variety of sensors are increasingly important in various applications and industries, for a variety of purposes. For example, magnetic sensors are often implemented in automotive applications. Magnetic parking sensors, angular sensors, ABS (Anti-lock Braking System) sensors and tire pressure sensors are used extensively in modern vehicles. Optical sensors are also used to sense position, proximity and other characteristics.

Magnetic sensors are particularly useful in automotive applications, because magnetic fields penetrate easily through most materials. Magnetic sensors are also highly insensitive to dirt and other conditions that may be challenging, for example, to the proper operation of optical sensors.

One type of automotive sensor application involves wheel speed sensors, such as those used in ABS systems. In these applications, an encoder wheel is used for sensing the rotation of the automotive wheel used for moving the vehicle. Sensors are placed relative to the encoder wheel, and are used to sense the rotation thereof.

While useful in a variety of applications, encoder wheels such as magnetized encoder wheels have generally been expensive to implement. In addition, such applications are susceptible to misalignment of the axis of rotation of the encoder wheel with the sensor axis. Accordingly, the implementation of sensors, such as magnetic sensors, in applications susceptible to movement or misalignment with respect to the sensors continues to be challenging.

Various example embodiments are directed to sensing magnetic fields in a manner that is tolerant to alignment of the fields for a variety of applications, including those discussed above.

In connection with an example embodiment, a magnetic field sensor arrangement includes a reference component and first and second magnetic sensors. The reference component is configured to influence a magnetic field as a function of a position of the reference component. The first magnetic sensor is aligned with a first magnetic field sensitivity direction and exhibits an electrical response to the presence of the magnetic field. The second magnetic sensor is aligned with a second magnetic field sensitivity direction and exhibits an electrical response to the presence of the magnetic field, the first and second magnetic field sensitivity directions being offset from one another to facilitate detection of magnetic fields at different relative alignments between the reference component and the first and second magnetic sensors.

Another example embodiment is directed to a sensor arrangement for sensing the movement of a reference component that influences a magnetic field over time. The sensor arrangement includes a first magnetic sensor that is aligned with a first magnetic field sensitivity direction and exhibits an electrical response to variations in the magnetic field over time due to the influence of the reference component. The sensor arrangement also includes a second magnetic sensor that is aligned with a second magnetic field sensitivity direction, and that exhibits an electrical response to variations in the magnetic field over time due to the influence of the reference component. The first and second magnetic field sensitivity directions are offset from one another to facilitate detection of variations in the magnetic field at different relative alignments between the magnetic field and the first and second magnetic sensors.

Another embodiment is directed to a method for sensing the movement of a reference component that influences a magnetic field over time. At a first magnetic sensor aligned with a first magnetic field sensitivity direction, an electrical response is generated based on variations in the magnetic field over time due to the influence of the reference component. At a second magnetic sensor aligned with a second magnetic field sensitivity direction, another electrical response is generated based on variations in the magnetic field over time (as presented to the second sensor) due to the influence of the reference component. The first and second magnetic field sensitivity directions are offset from one another to facilitate detection of variations in the magnetic field at different relative alignments between the magnetic field and the first and second magnetic sensors.

The above discussion is not intended to describe each embodiment or every implementation of the present disclosure. The figures and following description also exemplify various embodiments.

Various example embodiments may be more completely understood in consideration of the following detailed description in connection with the accompanying drawings, in which.

Figure 1:
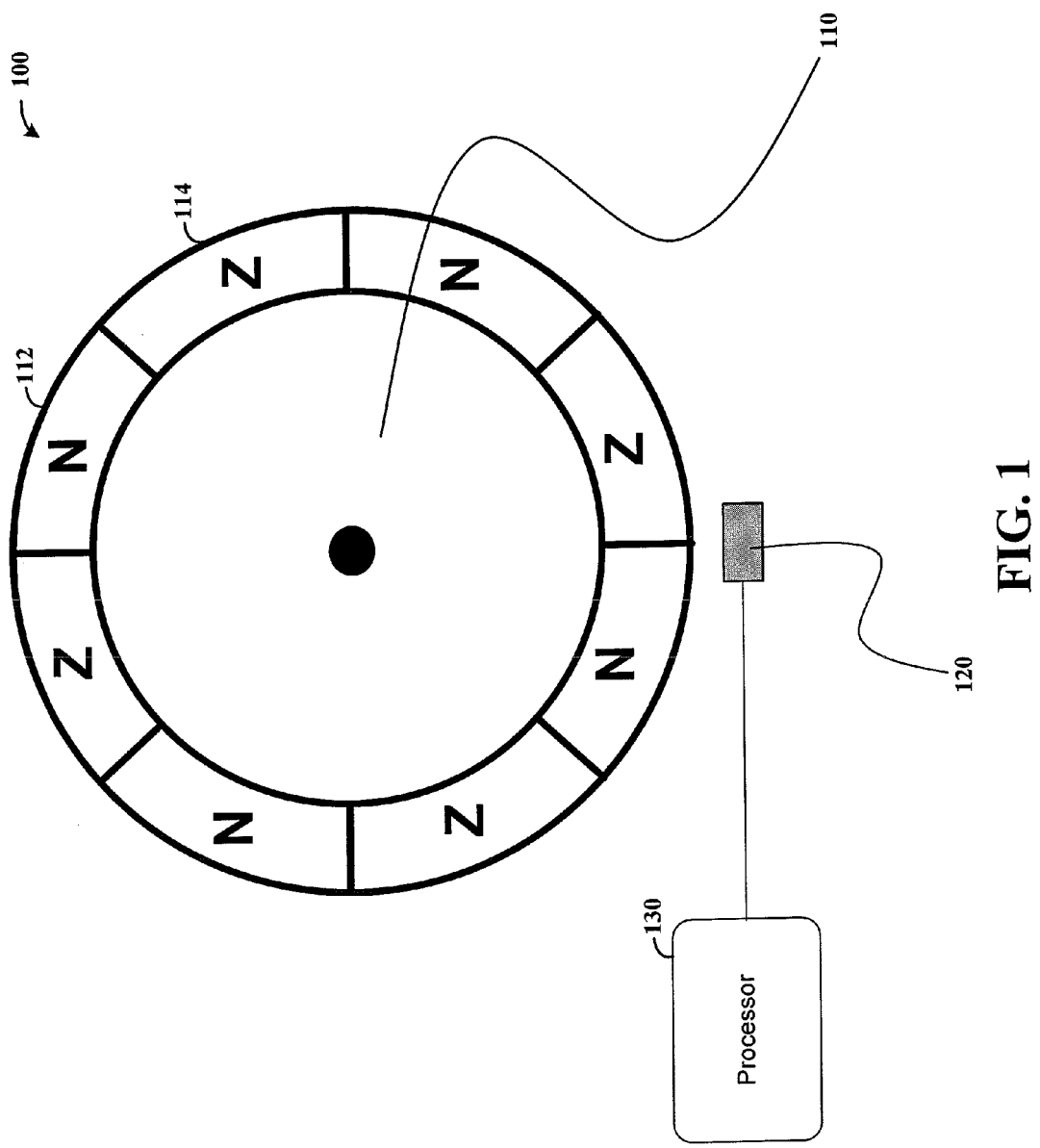
FIG. 1 shows an active rotational sensor arrangement, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

The present invention is believed to be applicable to a variety of different types of processes, devices and arrangements for use with sensor applications, including magnetic sensor applications. While the present invention is not necessarily so limited, various aspects of the invention may be appreciated through a discussion of examples using this context.

According to an example embodiment, a magnetoresistive sensor device includes a pair of sensors and a reference component (or components) having magnetic characteristics. The reference component may, for example, include a gear, wheel or other device for which a positional-type characteristic is to be sensed, either directly or as part of the component's influence upon a magnetic field, such as by generating a magnetic field or altering a magnetic field. The sensors are oriented for detecting differently-oriented magnetic fields, and sense ambient magnetic characteristics that relate to the relative positioning of the reference component and the sensors. The sensor device is tolerant of movement or misalignment of the reference component and sensors, using outputs of the respective sensors in combination to detect magnetic characteristics of the reference component that may vary depending upon the relative alignment.

In this context, the combined sensor output can be used for detecting positional characteristics of the reference component, in a manner that is tolerate to movement, alignment or twist of the reference component as relative to the sensors. This tolerance facilitates the detection of positional characteristics under conditions in which either or both the reference component and the sensors are moved, twisted or otherwise misaligned relative to one another. For instance, where the reference component is a rotational component connected to a wheel, shaft or other rotating device, the sensors are configured for detecting a positional characteristic corresponding to the rotation of the reference component without requiring precise alignment therebetween. Such applications are useful, for example, in automotive vehicle wheel speed detection for which the reference component is an encoder wheel that rotates with the rim/wheel of the automotive vehicle. If the axis of the encoder wheel is not well aligned during mounting, the sensors will give an output signal that is sufficiently strong for detecting movement of the encoder wheel.

In some implementations, the sensor device further includes an offset field compensation circuit. For example, as the bias field for the pair of sensors generates a DC offset field for at least one of the sensors, the offset field compensation circuit processes signals from the sensors to remove the DC offset from the sensor output signals, which can be used to facilitate zero-crossing detection. Such detection may be applicable, for example, to detecting a field value that varies based upon the position of a reference component, in which the passing of a tooth or other magnetic component or alternating components applying different magnetic fields can be detected as the value of a detected field crossing a "zero" value (e.g., as magnets of opposite polarity pass the sensor).

Various reference components are used in accordance with different embodiments. As discussed above, some embodiments are directed to sensing the position of an encoder wheel that is connected to rotate with (or as part of) an automotive wheel. Other embodiments are directed to sensing the position of an encoder component, such as a wheel or other-shaped component, as connected to other rotating devices such as those in engines or other machinery. For instance, the position of a variety of components can be sensed, such as cams, cylinders, gears and others including those that are susceptible to relative (or other) misalignment. The reference components used for these applications may actively generate a varying magnetic field based upon position, or passively generate a magnetic field as used in connection with an external magnet (e.g., a toothed metallic wheel).

A variety of sensors are used to suit different applications. In some embodiments, magnetoresistive sensors are used in connection with an active or passive reference component, or other types of magnetoresistive sensors to match the application in which the sensor is to be used, or as may be relative to sensor availability and cost. Where Hall sensors are used, the respective sensors are in-plane sensitive to X and Z magnetic fields and placed in parallel to the movement of the reference component (e.g., a toothed wheel). The Hall sensors do not need a bias field, and facilitates the detection of the teeth (and absence thereof) as the wheel rotates by the sensors. In some implementations, the Hall sensors include one of a magneto-transistor or magneto-resistor sensor, which can be monolithically integrated, and sensitive to silicon in-plane fields.

The sensors are placed relative to one another to sense magnetic fields in different directions, such as to suit a particular application. In some applications, the sensors are placed in respective alignment with fields that are generally perpendicular to one another. In other applications, the sensors are positioned for alignment to relatively close magnetic fields, such as fields that vary less than about 45 degrees in position, with the sensors placed relative to one another (e.g., at nearly 45 degrees) to facilitate a strong signal.

Turning now to the Figures, FIG. 1 shows an active rotational sensor arrangement 100, according to another example embodiment of the present invention. The sensor arrangement 100 may, for example, be implemented as a wheel speed sensor for automotive applications, such as for use in ABS systems. The sensor arrangement 100 includes an active encoder wheel 110 having alternating regions (N and Z) of opposite magnetic characteristics (opposite magnetic pole pairs), with (N) region 112 and (Z) region 114 labeled for illustration, with the further understanding that such encoder wheels may include a multitude of such regions, such as for detecting rotation of the wheel with higher accuracy. The encoder wheel 110 generates, via its alternating regions, magnetic fields from the respective north-to-south pole in each alternating region.

The sensor arrangement also includes a sensor device 120 that senses the presence or proximity of the respective alternating regions (112, 114 and others) relative to the sensor device 120, and provides an output corresponding to this sensed condition to a processor 130. The processor 130 uses the output to provide an indication of a positional characteristic of the encoder wheel 110 (e.g., a rotational position of the wheel, or a rotational speed of the wheel). In some implementations, the processor 130 is integrated with the sensor device 120.

The sensor device 120 includes two or more sensors, as described herein, respectively aligned to different magnetic field directions. The sensors are arranged to sense the (changing) magnetic field corresponding to each of the alternating regions as the encoder wheel 110 rotates by the sensors, and to do so under various orientations of the encoder wheel relative to the sensor device 120 (e.g., as the encoder wheel 110 or the sensor device 120 twists or moves). The sensors in the sensor device 120 detect the direction switching (or sign switching) of the magnetic field according to the alternating regions. In some implementations, the sensors in sensor device 120 are anisotropic magnetoresistive AMR sensors and the device includes a magnet that stabilizes the AMR sensors.

Figure 2:
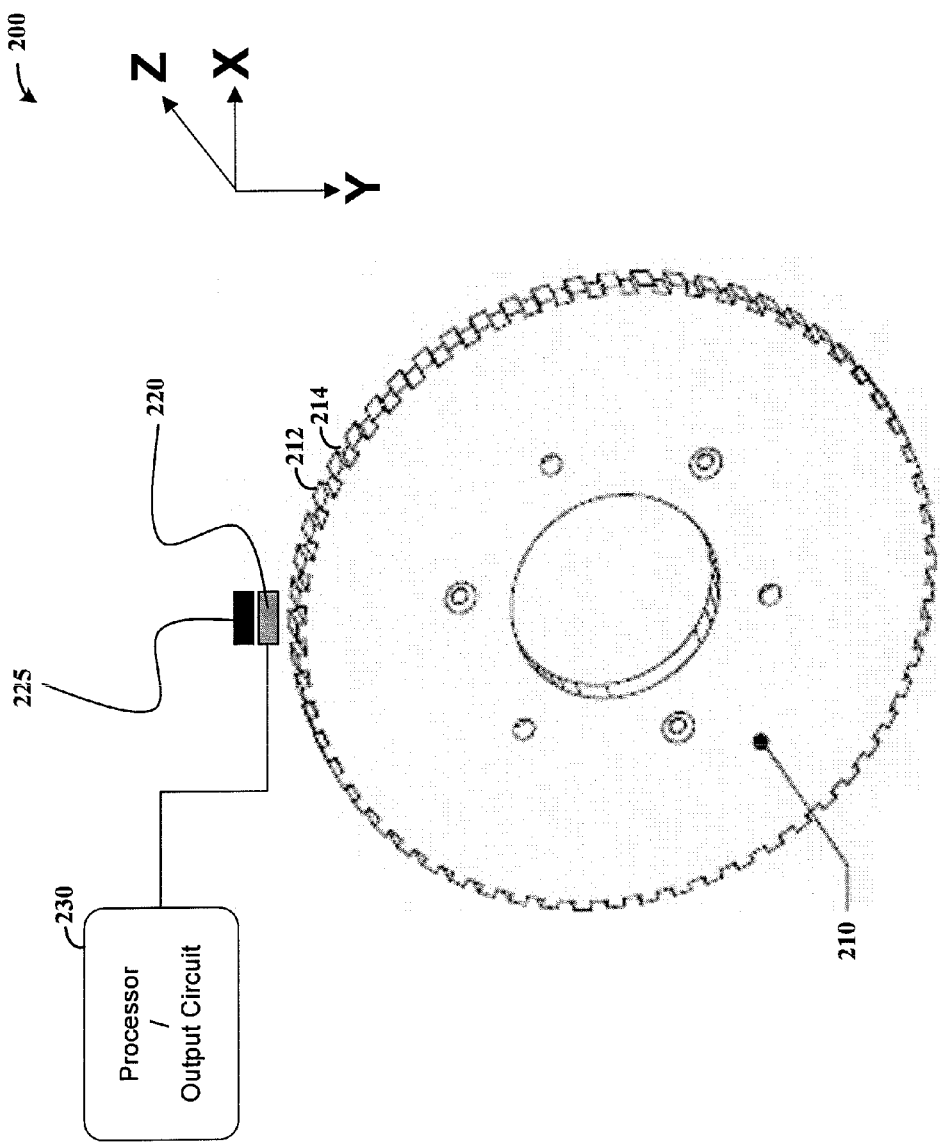
FIG. 2 shows a passive rotational sensor arrangement, according to another example embodiment of the present invention.

FIG. 2 shows a passive rotational sensor arrangement 200, according to another example embodiment of the present invention. The sensor arrangement 200 includes a toothed passive encoder wheel 210, a sensor device 220 and an external magnet 225 (or other device that generates a magnetic field). A processor or output circuit 230 is connected to receive outputs of the sensors in the sensor device 220, and to process the outputs for indicating a positional characteristic of the passive encoder wheel as pertaining to rotation of the wheel and movement relative to the sensor device. In some implementations, the processor/output circuit 230 is a circuit that performs an operation on the outputs of the sensors, such as an adder circuit that adds or subtracts the outputs. In other implementations, the processor/output circuit 230 includes a computer type of processor circuit that is programmed to process the outputs for indicating the positional characteristic, such as by generating another output that characterizes the speed of the encoder wheel 210, or a mechanical component to which the wheel is attached.

The passive encoder wheel 210 uses a read-out scheme that is based upon the teeth and gaps therebetween as shown, with tooth 212 and gap 214 labeled for illustration. The external magnet 225 is placed close to the passive encoder wheel 210 and the sensor device 220, such that magnetic field lines generated by the magnet are influenced by the teeth 212 and gaps 214 of the passive encoder wheel. This deviation occurs in accordance with the rotation of the passive encoder wheel 210 and the presentation of alternating tooth 212 and gap 214 portions of the encoder wheel to the sensor. These alternating regions generate a residual field in the sensitive (e.g., X) direction of the sensor device 220, which is sensed by the sensor device 220. An output of the sensor device is thus indicative of the passing of the respective tooth 212 and gap 214 portions, and thus indicates rotation of the passive encoder wheel 210.

By use of the magnet 225, the passive encoder wheel 210 may be implemented using materials that are not magnetized. However, certain implementations involve the use of such a wheel that is magnetized, or at least having a portion that is magnetized. For instance (and in accordance with certain embodiments), referring to FIG. 1, the respective tooth 212 and gap 214 regions include magnet regions of opposite poles. In other embodiments, the teeth 212 are magnetized while the gaps 214 are not. Other such arrangements are implemented with other embodiments, to achieve a varying magnetic field at the sensor arrangement 220 that can be detected.

Different types of sensors can be used in the sensor device 220, to suit the application. For example, magnetic sensors based on one or more of a variety of principles as discussed above can be used, with magnet 225 supplying a bias field (as exemplified via the indicated field directions) such that the field is influenced by the tooth 212 and gap 214 regions of the passive encoder wheel 210.

As applicable to both FIGS. 1 and 2, each of the two (or more) sensors in the sensor device 120 or sensor device 220 is aligned to different magnetic field directions, to account for potential misalignment between the respective encoder wheels (110, 210) and sensor device (120, 220), and/or with magnet 225 as may be applicable. For instance, in some embodiments, the sensors are aligned at about a 90 degree angle relative to one another, for respectively aligning with magnetic fields at such angles. When a magnetic field is aligned between the positioning of the sensors, each sensor is influenced by and/or otherwise detects the field such that the combined output of the sensors is indicative of the influence of the encoder wheel (110 or 210) upon the magnetic field. When a magnetic field is aligned directly with one of the sensors, that sensor may account for a full strength of an output used to detect the presence/influence upon the magnetic field.

The processors 130 or 230 of FIGS. 1 and 2 operate to use an output of the sensor devices 120 or 220, to provide an indication of the position of the respective encoder wheels 110 and 210. For example, signals from each of the sensors in the sensor devices 120 and 220 can be combined and used to generate an output that is indicative of a rotational position, or speed, of the encoder wheels 110, 210 in a manner that is generally independent from the orientation of the encoder wheels as relative to the sensor devices. In some implementations, the sensors are used to detect the type of pole (north or south) present adjacent the sensor, or the presence of a tooth or gap in front of the sensor in a passive application.

The positioning of the sensors 120 and 220, as well as the processing of outputs therefrom, may be carried out using one or more approaches as described in connection with FIG. 3 or 4 below. Each of these figures is discussed and shown in the context of their respective applicability for use with an encoder wheel having alternating tooth and gap regions, such as the encoder wheel 210 shown in FIG. 2 and described above. However, FIGS. 3 and 4 and approaches discussed in connection therewith may be implemented with an active encoder wheel such as encoder wheel 110 shown in FIG. 1, with the shown "tooth" and "gap" regions corresponding instead to regions of alternating polarity (e.g., 112, 114 in FIG. 1). Other encoder wheels are also applicable for implementation with various embodiments, involving different arrangements for presenting alternating magnetic fields to a sensor for positional, such as rotational, sensing.

Figure 3:
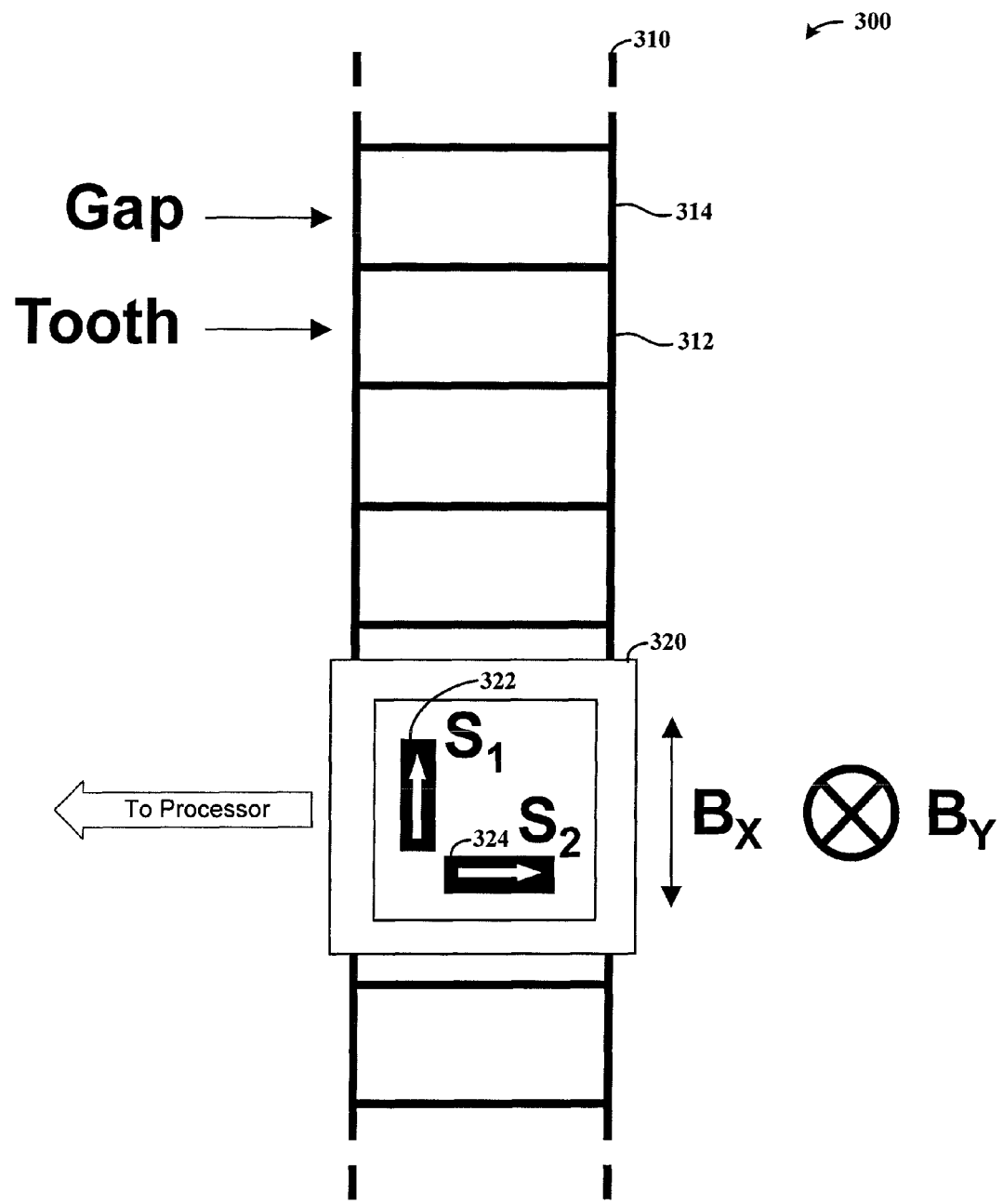
FIG. 3 shows a motion-tolerant sensor arrangement, according to another example embodiment of the present invention.

Referring to FIG. 3, a sensor arrangement 300 is shown with an encoder wheel 310 having alternating tooth 312 and gap 314 regions, and a sensor device 320 positioned to sense a magnetic field as influenced and/or generated by the encoder wheel 310. The sensor device 320 includes two sensors 322 and 324, respectively aligned to magnetic field directions that are about 90 degrees apart, and lying generally coplanar relative to one another.

The sensors 322 and 324 may be implemented with a variety of different types of sensors, and the sensor arrangement 300 may further include an external magnet (such as 225) where appropriate as relative to the sensor types. Using the example of a pair of in-plane Hall sensors, the sensors 322 and 324 are sensitive in the direction of the white arrow in each sensor. A magnet (not shown for clarity) is over the sensor and generates a field $B_Y$ as shown. Due to the rotation of the encoder wheel 310 and relative positioning of the teeth and gaps 312 and 314, the field lines of $B_Y$ are bent in the positive and negative X direction as the teeth pass the sensor device 320, yielding a magnetic field component in the X direction, $B_X$. The sensor 322 is perfectly aligned with the X-axis, and therefore will give an output signal due to the magnetic field in the X direction. If due to misalignment of one or more components, such as may be due to inaccurate mounting (e.g., if the sensor is screwed into the chassis of, for example, a transmission or engine), the sensor device 320 may not be aligned with the magnetic field component $B_X$, which carries the wheel rotation speed information. Under such conditions, the output signal of sensor 322 may be attenuated and can even reduce to zero. An exemplary output of the sensor 322 is represented by $$V_{out} = B_X \cdot c \cdot S_1 \cdot \sin(\alpha), \quad \text{(Equation 1)}$$

in which c is a constant. When $\alpha = n \cdot 180°$ (n is an integer), the output signal of the sensor 322 can reduce to zero.

Accordingly, as one or both of the sensor device 320 or the encoder wheel 310 move relative to one another, the output of the sensor 322 may be reduced. The use of the sensor 322 together with sensor 324 facilitates tolerance of misalignment, via placement of the respective sensors on perpendicular axes. With perfect alignment between sensor 322 and $B_X$, sensor 324 does not give additional output and can be disregarded. However, as the relative alignment of the magnetic field changes, an output of both sensors 322 and 324 can be used, or that of sensor 324 (upon alignment of the field therewith).

Another example embodiment is directed to an alignment-tolerant sensor arrangement that may be implemented, for example, using a sensor arrangement as shown in FIG. 3. The following discussion references certain aspects of the sensor arrangement 300 by way of example. A reference component (310) influences a magnetic field as a function of a position of the reference component, such as by generating a magnetic field (e.g., with magnets of alternating polarity), or by influencing an externally-generated magnetic field (e.g., using alternating teeth and gaps of a sensor wheel). A first magnetic sensor (e.g., 322) is aligned with a first magnetic field sensitivity direction and configured to exhibit an electrical response to the presence of the magnetic field. A second magnetic sensor (e.g., 324) is aligned with a second magnetic field sensitivity direction and configured to exhibit an electrical response to the presence of the magnetic field, the first and second magnetic field sensitivity directions being offset from one another to facilitate detection of magnetic fields at different relative alignments between the reference component and the first and second magnetic sensors.

Other aspects are further directed to an output circuit or processor connected to receive the electrical responses of the sensors and to combine the responses to generate an output indicative of a positional characteristic of the reference component. Such an output circuit/processor may, for example, be implemented with the sensor arrangement 300 in a manner similar to that implemented with the processor circuit 230 in FIG. 3. Discrete logic circuits, computers, and other processor circuits can be used to generate the output. In some implementations, the processor circuit determines an orientation of the magnetic field relative to at least one of the sensors, and combines the electrical responses based upon the determined orientation of the magnetic field. The orientation may be determined, for example, using the derivative of a signal corresponding to the electrical responses of the sensors, and can further be used to combine the signals in a manner to ensure that a zero-crossing condition can be detected and used to identify the movement of the reference component.

Figure 4:
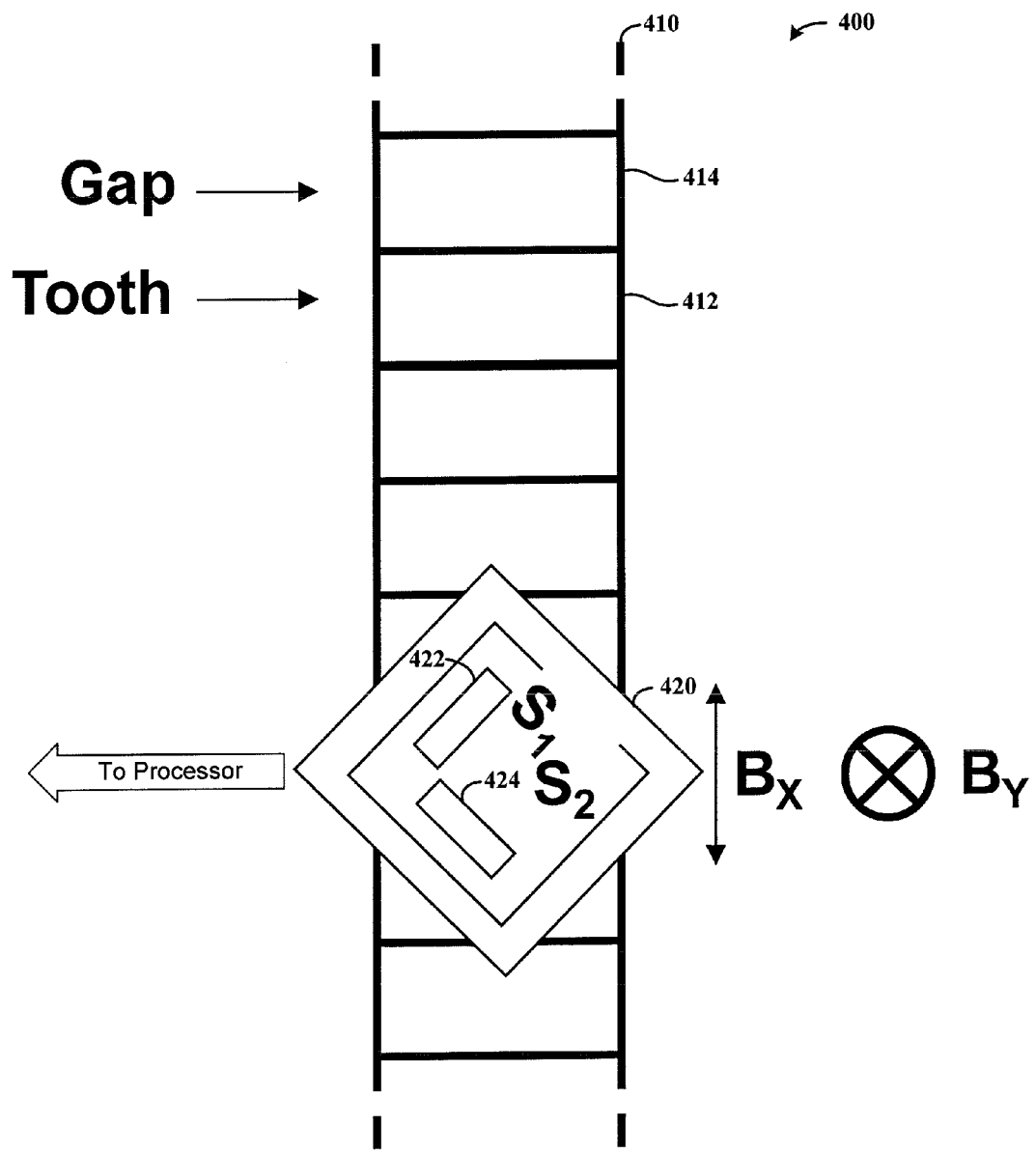
FIG. 4 shows another motion-tolerant sensor arrangement, according to another example embodiment of the present invention.

Referring to FIG. 4, a sensor arrangement 400 is shown with a misaligned sensor. As similar to the sensor arrangement 300, sensor arrangement 400 includes an encoder wheel 410 having teeth 412 and 414, and a sensor device 420 with sensors 422 and 424. With the exemplary alignment shown, sensors 422 and 424 both generate an output signal for a certain α. The sensor outputs are combined to give an overall output signal for the sensor device 420. Using both sensor outputs, the combined sensor output will be $$V_{out}=c\cdot\sqrt{2}\cdot B_X\cdot S\cdot \sin(\alpha-45°),\quad\text{(Equation 2)}$$

where the sensitivity of both sensors 422 and 424 are equal. Where the sensitivity of the sensors is not equal, the outputs are combined accordingly (e.g., weighted).

For certain values of α, the output of the sensor device 420 can still become zero. Therefore, the outputs of both sensors are also subtracted, with the combined sensor output signal being $$V_{out}=c\cdot\sqrt{2}\cdot B_X\cdot S\cdot \cos(\alpha-45°).\quad\text{(Equation 3)}$$

After mounting the sensor system, a determination can be made as to whether to subtract or add the outputs of both sensors, based upon the outputs. For example, if the axis of one of the sensors is perfectly aligned with the field $B_X$, one sensor can be used. This determination can be done, for example, by comparing the derivative of both sensor output signals to determine how the output signal amplitudes of both sensors relate, and which sensor combination to use to come to an accurate zero-crossing detection. Such determination may, for example, be made in a processor such as processor 130 of FIG. 1 or 230 of FIG. 2.

Figure 5:
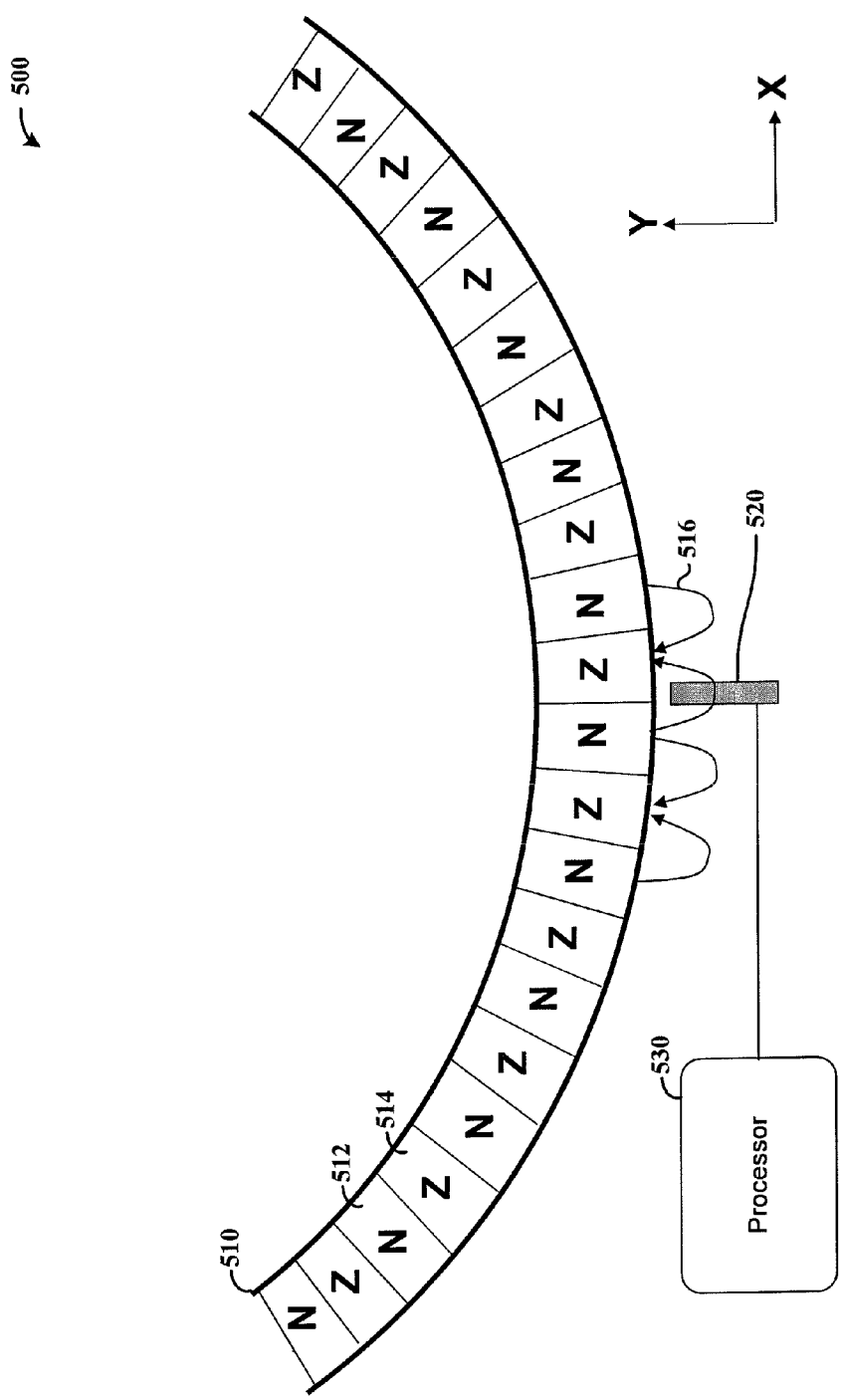
FIG. 5 shows an active rotational sensor arrangement, according to another example embodiment of the present invention.

FIG. 5 shows an active rotational sensor arrangement 500 with a sensor orientation generally perpendicular to that as shown in the preceding figures, according to another example embodiment of the present invention. The sensor arrangement 500 may, for example, be implemented as a wheel speed sensor for automotive applications as discussed in connection with FIG. 1 above. The sensor arrangement 500 includes an active encoder wheel 510 having alternating regions (N and Z) of opposite magnetic characteristics (opposite magnetic pole pairs), with (N) region 512 and (Z) region 514 labeled for illustration. The encoder wheel 510 generates, via its alternating regions, magnetic fields from the respective north-to-south pole in each alternating region with arrows at 516 exemplifying these fields. A sensor device 520 senses the presence or proximity of the respective alternating regions as they rotate by the sensor, and provides a corresponding output to a processor 530. The processor 530 uses the output to provide an indication of a positional characteristic of the encoder wheel 510 (e.g., wheel speed). In some implementations, the processor 530 is integrated with the sensor device 520.

The sensor device 520 includes two or more sensors, as described herein, respectively aligned to different magnetic field directions. For example, relative to the sensors shown in FIG. 3, the sensor 520 can be implemented using a similar sensor, effectively stood on edge relative to the plane shown in FIG. 3. For instance, the two or more sensors can be integrated on a substrate in a YZ plane, with the Z-axis perpendicular to the drawing plane in FIG. 5. The sensor 520 accommodates twist in its mounting (e.g., around one or more of the Y, X and Z axes) when the sensor outputs are summed appropriately as discussed herein. For example, a Z-axis sensor gives a maximum output signal at the North-South pole transition, and an X-Y-axis sensor giving a maximum signal in the middle of the poles. In some implementations, the sensors are used to detect the type of pole (north or south) present adjacent the sensor.

In accordance with the above and other embodiments with respect to axis sensitivity, two sensors exhibit sensitivity as follows. Sensors that are sensitive in the YZ direction are twist insensitive to rotation around the X-axis, sensors that are sensitive in the YX direction are twist insensitive to rotation around the Z-axis, sensors that are sensitive in the YZ direction are twist insensitive to rotation around the X-axis, and sensors that are sensitive in the XZ direction are twist insensitive to rotation around the Y-axis. Relative to a single sensor, a sensor that is sensitive in the X direction is twist insensitive to rotation around the X-axis, and has its maximum/minimum values at a transition to North-South or South-North pole. A single sensor that is sensitive in the Y direction is twist insensitive to rotation around the X-axis, and has its maximum/minimum values at the North or South pole. A single sensor that is sensitive in the Z-axis in this configuration can be implemented when a corresponding reference component or wheel affecting the magnetic field is shifted relative to the sensor (e.g., a-centrically) in the Z-axis direction.

Based upon the above discussion and illustrations, those skilled in the art will readily recognize that various modifications and changes may be made to the present invention without strictly following the exemplary embodiments and applications illustrated and described herein. For example, different types of sensors, such as different types of magnetoresistive sensors, may be implemented in addition to and or as an alternative to the sensors discussed in connection with the various embodiments above. Different types of speed sensor components, such as wheels, gears or other components, and active or passive components, can also be used in accordance with various approaches. In addition, various embodiments are directed to implementation with other sensor applications susceptible to movement. Furthermore, the various processing approaches described herein can be implemented using a variety of devices and methods including general purpose processors implementing specialized software, digital signal processors, programmable logic arrays, discreet logic components and fully-programmable and semi-programmable circuits such as PLAs (programmable logic arrays). Such modifications do not depart from the true spirit and scope of the present invention, including that set forth in the following claims.

What is claimed is:

1. A magnetic field sensor arrangement comprising:
a reference component configured to influence a magnetic field as a function of a position of the reference component, the reference component having an axis of rotation;
a first magnetic sensor aligned with a first magnetic field sensitivity direction and configured to exhibit an electrical response to the presence of the magnetic field; and
a second magnetic sensor aligned with a second magnetic field sensitivity direction and configured to exhibit an electrical response to the presence of the magnetic field, the first and second magnetic field sensitivity directions being offset from one another to provide respective electrical responses that, when combined, facilitate detection of magnetic fields at different relative alignments between the reference component and the first and second magnetic sensors; and
a processor circuit connected to receive the electrical responses of the sensors, to process the responses to determine an orientation of the magnetic field relative to at least one of the sensors, and to combine the electrical responses based upon the determined orientation of the magnetic field to provide a combined response indicative of rotation of the reference component about the axis of rotation that is independent of alignment between the axis of rotation and the sensors.

2. The sensor arrangement of claim 1, further including an output circuit connected to receive the electrical responses of the sensors to a magnetic field emanating from a surface of the reference component, and to combine the responses to generate an output indicative of a positional characteristic of the reference component.

3. The sensor arrangement of claim 1, wherein the first magnetic sensor and the second magnetic sensor are aligned such that an imaginary line going through at least the first magnetic sensor and the reference component is substantially perpendicular to the axis of rotation.

4. The sensor arrangement of claim 1, further including a processor circuit connected to receive the electrical responses of the sensors and to
process the responses to determine an orientation of the magnetic field relative to at least one of the sensors based upon a derivative of the electrical responses of both sensors, and
combine the electrical responses based upon the determined orientation of the magnetic field.

5. The sensor arrangement of claim 1, further including a processor circuit connected to receive the electrical responses of the sensors and to
compute the derivative of each of the electrical responses of the sensors,
determine an orientation of the magnetic field relative to at least one of the sensors based upon the computed derivatives, and
combine the electrical responses based upon the determined orientation of the magnetic field.

6. The sensor arrangement of claim 1, further including an offset field compensation circuit configured to remove a DC offset field component of an output of one of the sensors corresponding to a bias field, to facilitate zero-crossing detection.

7. The sensor arrangement of claim 1, wherein
the reference component includes a region that influences the magnetic field by generating a magnetic field, and
the sensors are configured and arranged to sense the generated magnetic field to identify a positional characteristic of the reference component, with the first and second magnetic field sensitivity directions being aligned differently, relative to the magnetic field generated by the reference component.

8. The sensor arrangement of claim 1, wherein
the reference component is a rotatable wheel having alternating regions including regions that generate a magnetic field,
the sensors are arranged in a plane located parallel to a surface of the rotatable wheel,
the sensors are configured to sense a positional characteristic of the rotatable wheel based upon positioning of the magnetic field relative to the sensors as the wheel rotates.

9. The sensor arrangement of claim 1, wherein
the reference component is a rotatable wheel having alternating regions including regions that generate a magnetic field,
the sensors are arranged in a plane located perpendicular to a surface of the rotatable wheel,
the sensors are configured to sense a positional characteristic of the rotatable wheel based upon positioning of the magnetic field relative to the sensors as the wheel rotates.

10. The sensor arrangement of claim 1, wherein
the reference component includes alternating regions including regions that generate a magnetic field of a first polarity and regions that generate a magnetic field of an opposite polarity that is opposite the first polarity, and
the sensors are configured to sense a positional characteristic of the reference component based upon positioning of the respective magnetic fields relative to the sensors as the reference component moves.

11. The sensor arrangement of claim 1, wherein
the reference component includes a region that influences a magnetic field at the sensors, and
the sensors are configured to sense the influence upon the magnetic field to identify a positional characteristic of the reference component.

12. The sensor arrangement of claim 1, wherein
the reference component includes alternating regions that differently influence a magnetic field at the sensors, and
the sensors are configured to sense a positional characteristic of the reference component based upon the influence upon the magnetic field as the reference component moves.

13. The sensor arrangement of claim 1,
further including a magnetic component that is independent of the reference component and that is configured to generate a magnetic field at the sensors, and
wherein
the reference component includes alternating regions that differently influence the magnetic field at the sensors, and
the sensors are configured to sense a positional characteristic of the reference component based upon the influence upon the magnetic field as the reference component moves.

14. A sensor arrangement for sensing movement of a reference component that influences a magnetic field over time, the sensor arrangement comprising:
- a first magnetic sensor aligned with a first magnetic field sensitivity direction and configured to exhibit an electrical response to variations in the magnetic field over time due to the influence of the reference component;
- a second magnetic sensor aligned with a second magnetic field sensitivity direction and configured to exhibit an electrical response to variations in the magnetic field over time due to the influence of the reference component, the first and second magnetic field sensitivity directions being offset from one another to facilitate detection of variations in the magnetic field at different relative alignments between the magnetic field and the first and second magnetic sensors; and
- a processor circuit connected to receive the electrical responses of the sensors, to process the responses to determine an orientation of the magnetic field relative to at least one of the sensors, and to combine the electrical responses based upon the determined orientation of the magnetic field to provide a combined response indicative of rotation of the reference component about the axis of rotation that is independent of alignment between the axis of rotation and the sensors.

15. The sensor arrangement of claim 14, further including an output circuit configured to combine the electrical responses of the first and second magnetic sensors to generate an output indicative of the variation in the magnetic field over time, the magnetic sensors being configured and arranged to provide the electrical responses such that the combination of the electrical responses is consistent for different alignments of the reference component, relative to the sensors.

16. The sensor arrangement of claim 14, further including a processor circuit configured to
- receive the electrical responses of the sensors,
- compute the derivative of signals corresponding to variations in the electrical responses over time,
- determine an orientation of the magnetic field relative to at least one of the sensors based upon the computed derivatives, and
- combine the electrical responses based upon the determined orientation of the magnetic field.

17. A method for sensing movement of a reference component that influences a magnetic field over time, the method comprising:
- at a first magnetic sensor aligned with a first magnetic field sensitivity direction, generating an electrical response to variations in the magnetic field over time due to the influence of the reference component;
- at a second magnetic sensor aligned with a second magnetic field sensitivity direction, generating an electrical response to variations in the magnetic field over time due to the influence of the reference component, the first and second magnetic field sensitivity directions being offset from one another to facilitate detection of variations in the magnetic field at different relative alignments between the magnetic field and the first and second magnetic sensors; and
- at a processor circuit connected to receive the electrical responses of the sensors, processing the responses to determine an orientation of the magnetic field relative to at least one of the sensors, and combining the electrical responses based upon the determined orientation of the magnetic field to provide a combined response indicative of rotation of the reference component about the axis of rotation that is independent of alignment between the axis of rotation and the sensors.

18. The method of claim 17, further comprising combining the electrical responses of the first and second magnetic sensors to generate an output indicative of the movement of the reference component over time, wherein a combination of the electrical responses is consistent for different alignments of the reference component, relative to the sensors.

19. The method of claim 17, further including
- computing the derivative of each of the electrical responses,
- determining an orientation of the magnetic field relative to at least one of the sensors based upon the computed derivatives, and
- combining the electrical responses based upon the determined orientation of the magnetic field to generate an output indicative of the movement of the reference component.

20. The method of claim 17, further including
- computing the derivative of each of the electrical responses,
- determining an orientation of the magnetic field relative to at least one of the sensors based upon the computed derivatives, and
- combining the electrical responses based upon the determined orientation of the magnetic field to generate an output having zero crossing points indicative of movement of different portions of the reference component past the sensors.

* * * * *